(12) United States Patent
Lee

(10) Patent No.: US 11,116,244 B2
(45) Date of Patent: Sep. 14, 2021

(54) PRECISION COOKING SYSTEM

(71) Applicant: U.S. Department of Energy, Washington, DC (US)

(72) Inventor: Henry Yu-Heng Lee, San Jose, CA (US)

(73) Assignee: U.S. Department of Energy, Washington, DC (US)

( * ) Notice: Subject to any disclaimer, the term of this patent is extended or adjusted under 35 U.S.C. 154(b) by 179 days.

(21) Appl. No.: 16/249,068

(22) Filed: Jan. 16, 2019

(65) Prior Publication Data
US 2019/0223474 A1 Jul. 25, 2019

Related U.S. Application Data

(60) Provisional application No. 62/621,104, filed on Jan. 24, 2018.

(51) Int. Cl.
*A23L 5/10* (2016.01)
*A23L 5/30* (2016.01)
*F24C 7/04* (2021.01)
*A21B 1/02* (2006.01)
*H05B 6/00* (2006.01)
*F24C 7/08* (2006.01)
*F24C 7/00* (2006.01)
*F24C 1/00* (2006.01)

(52) U.S. Cl.
CPC ............... *A23L 5/15* (2016.08); *A21B 1/02* (2013.01); *A23L 5/10* (2016.08); *A23L 5/30* (2016.08); *A23L 5/32* (2016.08); *F24C 1/00* (2013.01); *F24C 7/00* (2013.01); *F24C 7/046* (2013.01); *F24C 7/087* (2013.01); *H05B 6/00* (2013.01); *A23V 2002/00* (2013.01)

(58) Field of Classification Search
CPC ..... A21B 1/02; A23L 5/10; A23L 5/15; A23L 5/30; A23L 5/32; A23V 2002/00; F24C 1/00; F24C 7/00; F24C 7/046; F24C 7/087; H05B 3/0033; H05B 6/00
USPC ....................................... 219/121.6
See application file for complete search history.

(56) References Cited

U.S. PATENT DOCUMENTS

| | | | | |
|---|---|---|---|---|
| 4,164,591 A | * | 8/1979 | Ahlgren | A47J 37/046 426/523 |
| 9,815,191 B2 | * | 11/2017 | Oleynik | G05B 19/42 |
| 2010/0270282 A1 | * | 10/2010 | Fernandez | F24C 7/06 219/392 |

* cited by examiner

*Primary Examiner* — Dana Ross
*Assistant Examiner* — Joseph W Iskra
(74) *Attorney, Agent, or Firm* — Wendell A. Peete; Brian J. Lally

(57) ABSTRACT

The present invention comprises a precision cooking oven that utilizes laser sheets to cook food, thus creating homogeneously heated and uniformly seared food bodies and surfaces. Laser sheets move back and forth evenly injecting heat into items being cooked. All food cold or hot areas can be eliminated since intersecting laser lines can be completely projected on and accommodate an item's exterior surfaces. Items with non-uniform cross-sections and properties can be cooked uniformly by controlling the exact amount of energy projected into differing sections of the food. The oven is also capable of cooking autonomously. Since laser sheets can be precisely controlled, cooking results can be very predictable once the boundary conditions for a thermal analysis are determined. The oven can detect the properties of the items to be cooked and thereafter compute the needed time and power to achieve the desired results stipulated by an oven operator.

16 Claims, 4 Drawing Sheets

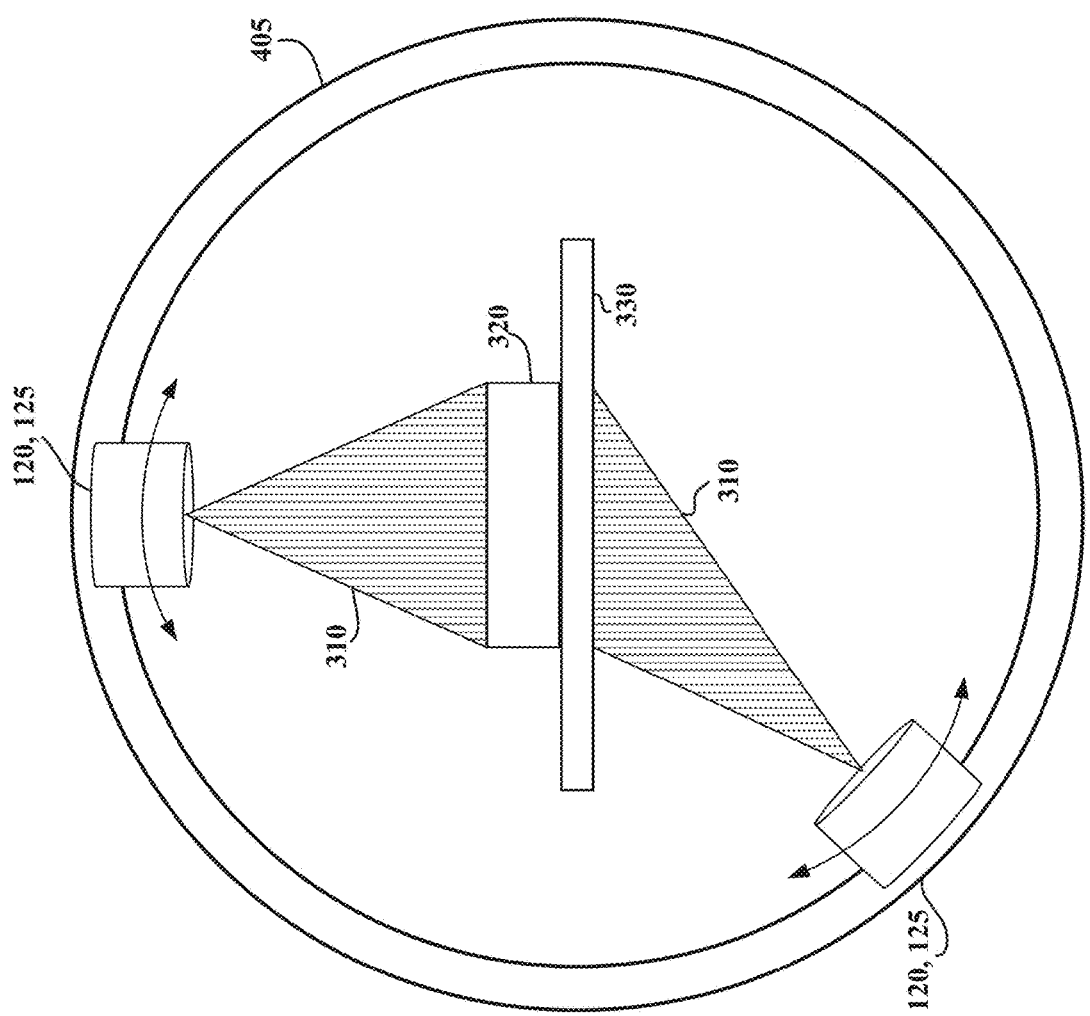

PRECISION COOKING SYSTEM

This application claims priority to provisional patent application 62/621,104 filed on Jan. 24, 2018.

The United States Government has rights in this invention pursuant to Contract No. DE-AC52-07NA27344 between Lawrence Livermore National Security, LLC and the United States Department of Energy for the operation of Lawrence Livermore National Laboratory.

BACKGROUND OF THE INVENTION

Field of the Invention

This invention relates to the field of food preparation ovens. In particular food preparation ovens that utilize lasers to assist in the cooking of food products for consumption.

Description of the Background

Most currently available cooking methods indirectly transfer heat from a heat source to a food product in order to cook the food product. For example, in order to boil food inside a pot water has to be heated first by a heat source. The energy absorbed by the water from the heat source is then transferred to the food being cooked. Food preparation techniques like stir-frying also rely on heating a wok or pan by an external heat source. This same heat transfer mechanism can also be used to describe dry-heat cooking methods (e.g., broiling, roasting, baking, sautéing, and frying) and moist-heat cooking methods (e.g., poaching, steaming, and simmering). Apart from the indirect-heat cooking methods mentioned above food can also be cooked directly by flame (i.e., grilling). However, flames are stochastic by nature and therefore difficult to control, especially when a high level of cooking precision is needed.

In comparison to the above-mentioned cooking approaches microwave ovens provide a more modern method of cooking. Microwave ovens cook food by exciting the internal water molecules of the food, thus causing the water molecules to vibrate resulting in the generation of friction and heat. This method allows heat to be generated internally within the food instead of having to apply heat either directly or indirectly to the food product in order to cook the food. However, this method can still be restricting, unpredictable, and unstable. Typically, the results of cooking utilizing this method largely depend on factors such as the types of containers being used, the moisture level of the food being prepared, and the exact orientation of the food that is being cooked.

Another method of cooking is sous-vide. The sous-vide cooking method essentially surrounds raw food with precisely heated water, wherein the food and water will eventually reach an equilibrium temperature. This is perhaps the most stable and precise cooking method that is currently available. However, this method has several downsides. Sous-vide cooking is often time-consuming and post-processing of prepared food is frequently needed since caramelization (i.e., browning of food) can't be achieved with this method.

Therefore, it can be properly ascertained that all currently available cooking methods are incapable of supplying heat precisely and accurately while at the same time providing culinary versatility. Further, none of the currently available cooking equipment or methods can accurately and comprehensively update operators with the real-time conditions of the food that is being cooked. As a result, food is often unevenly cooked resulting in hot and cold areas that often exist within the food that are undetectable, until the food is tasted.

SUMMARY OF THE INVENTION

The shortcomings of the prior art are overcome and additional advantages are provided through the provision of a precision cooking oven for the preparation of food products. Within an exemplary embodiment of the present invention the precision cooking oven comprises: an oven controller, in communication with the oven controller a control and display panel, and a thermally insulated cooking chamber. The thermally insulated cooking chamber further comprises a food placement surface, a rail ring, at least two food preparation laser devices that are in electrical communication with the oven controller, and a plurality of sensor mechanisms.

The food placement surface is configured in a fixed horizontal position within the cooking chamber. The rail ring is situated in a vertically fixed manner around the food placement surface. Further, the rail ring comprises an interior and an exterior surface.

The at least two food preparation laser devices are in electrical communication with the oven controller. The food preparation laser devices are configured to emit sheets of laser light and to mechanically engage the interior surface of the rail ring. As is well known, the light from laser beams is emitted and delivered as a highly collimated light source. Embodiments of the present invention further utilize the well know method of expanding the highly collimated light from a laser beam in one axis in order to configure and deliver the laser light sheets that are utilized within embodiments of the present invention (as shown in FIGS. 3 and 4). Each food preparation laser device comprises a primary and a secondary motor mechanism. The primary motor mechanisms are configured to move the emitted laser light sheets in preconfigured directions on the food that has been placed upon the food placement surface. The secondary motor mechanisms are configured to move the food preparations laser devices along the interior surface of the rail ring to predetermined locations upon the rail ring.

The plurality of sensor mechanisms are in communication with the oven controller. The sensor mechanisms comprise a weight sensor, a 3D scanning sensor, and a thermal imaging sensor.

The weight sensor is configured to detect the weight and density of all food items situated upon the food placement surface. While the 3D scanning sensor is configured to detect the volume and geometry of all food items situated upon the food placement surface. And the thermal imaging sensor is configured to detect the real-time temperature distribution within the food items situated upon the food placement surface.

Within further exemplary embodiments of the present invention the oven controller determines a thermal coefficient and a modulus of elasticity for each food item that is to be cooked from input information entered at the control panel by an oven operator. The information obtained by the weight, 3D scanner, thermal imaging sensor, and operator input information is utilized by the oven controller to generate a thermal finite element analysis (FEA) model of all detected food items within the oven. The FEA model generated by the oven controller has the capability to predict hot and cold regions within the volume of the food items that are being cooked in accordance with a predetermined default food item cooking setting.

The oven controller utilizes the results of the FEA model to calculate a cooking time, heating pattern, and a cooking power level for the cooking of the food items. Further, throughout the food item cooking process the weight, 3D scanning, and thermal imaging sensors continuously gather sensor information regarding the cooking food, the detected sensor information being utilized to continuously update the cooking time of the food, designated food heating patterns, and cooking power levels for the cooking food items. The oven controller utilizes the FEA results to adjust the cooking time, heating pattern, and a cooking power level for the elimination of hot and cold areas within the cooking food items and to achieve a thermal food item surface uniformity in the range of 90%-95%.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 is a front-facing view of two food preparation laser devices situated upon a rail ring and rotating around the food product placed upon the food placement surface within an exemplary embodiment of the present invention.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views. Herein, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of a referenced item.

The precision cooking system of the present invention provides many cooking advantages. These advantages include the following: consistency of food heating, food surface sear uniformity, energy usage efficiency, the provision of continuous operator cooking updates, and remote wireless oven control.

Figure 1:
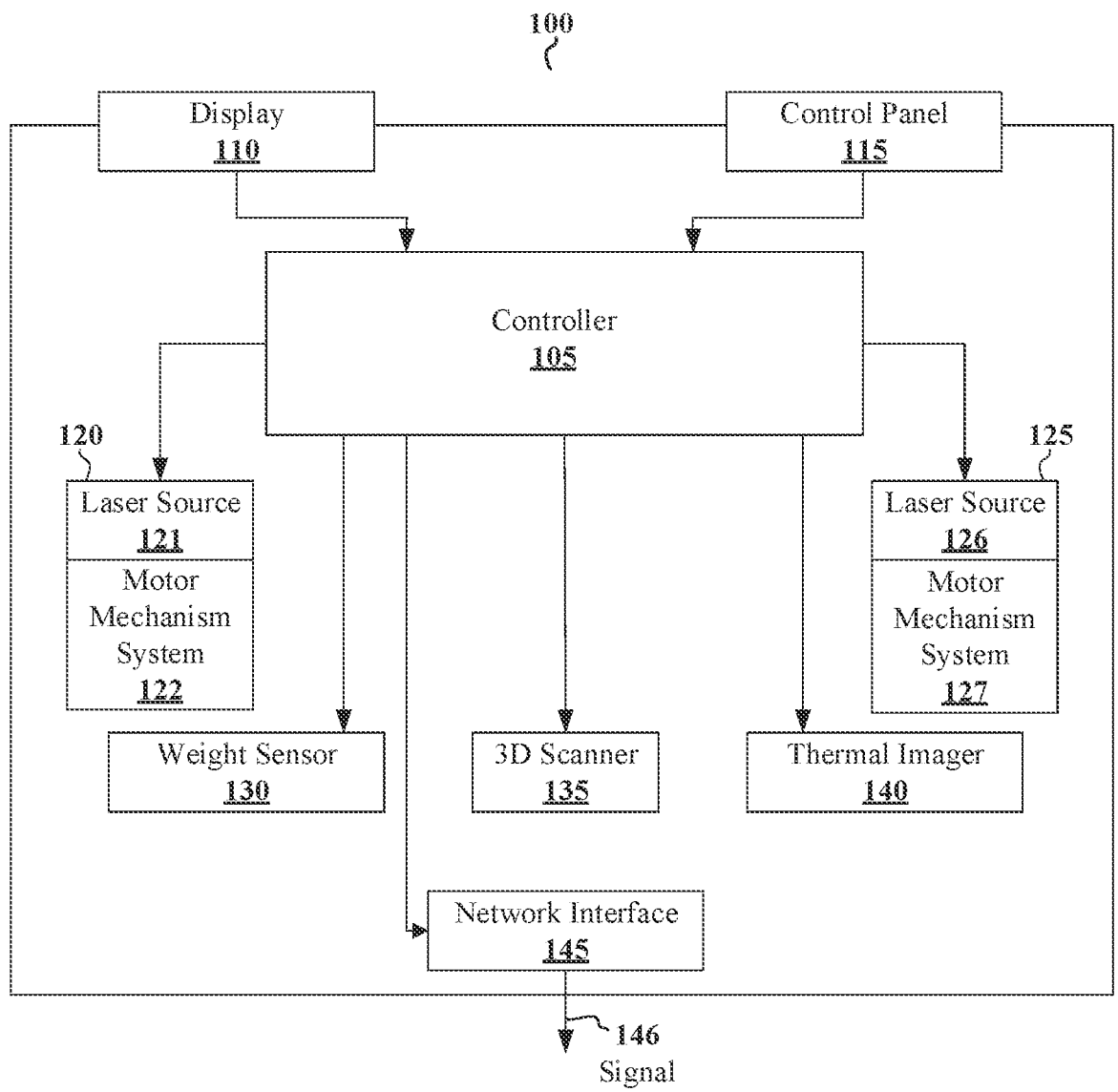
FIG. 1 is a diagram of the precision cooking oven components within an exemplary embodiment of the present invention.

In regard to the efficiency of food heating, the oven controller 105 of the present oven 100 (as shown in FIG. 1) determines the power needed and the cooking time that is necessary to cook a food item (or items) in accordance with an oven operator's desired result. In the even that it is desired that the surface of a food item be seared (e.g., during the preparation of a steak) since the food item is being seared by a laser instead of on a heated surface there will be no hot or cold areas on the seared surface of the food.

The laser sheets of the oven can be precisely controlled in order to eliminate hot or cold areas within a food item so as to create homogenously heated food bodies and uniformly seared food surface areas, the searing of food surface areas being accomplished through the implementation of a Maillard chemical reaction of the food body cooking within the oven. Also, differing food items can be cooked simultaneously within the oven since laser sheets with differing intensities can be utilized to simultaneously cook multiple food items.

In regard to the energy efficiency of the oven system 100 the utilization of laser sheets is superior in comparison to other cooking methods. Laser sheets transfer heat directly and exclusively to food items, wherein all transmitted energy is absorbed by the food item without the need to heat the entire internal area of the thermally insulated cooking chamber (not shown) of the oven 100. Since other cooking methods require the heating of a cooking environment there is no efficient distribution of heat into a food item versus that of the energy that is dissipated from the cooking environment and thus wasted. For example, consider the boiling of water in a pot. The boiling of water requires the heating of the entire body of water in the pot. As a result a significant amount of energy dissipates into the environment instead of going into the food item that is being cooked within the pot.

Within the exemplary embodiments of the present invention the precision cooking oven 100 has the capability to perform a transient thermal FEA with traveling heat loads in order to predict the power consumption and cooking time for a food item. The precision cooking oven 100 initially scans the internal properties of a food item (e.g., temperature and density) and thereafter uses these properties to build and run a thermal model of the food that is to be cooked. The solutions produced by this model are continuously iterated using the latest measured temperature distribution of the food item as the boundary condition. All food preparation cooking updates are reported to an oven operator in real-time.

Within further exemplary embodiments of the present invention the precision oven system 100 comprises a body made of food grade stainless steel, has a front access door (not shown), laser sources 121 and 126, laser source motors 122 and 127, sensors 130, 135, and 140, a display 110 and control 115 panel, electronic controller/processor 105, a network interface 145, and an internal food placement rack and/or surface. There is also a power cord situated at the back of the oven that can be connected to a standard home electrical outlet. The precision cooking oven's 100 size is similar to the size of a conventional microwave oven. The precision cooking oven 100 can be opened by a touch panel (not shown) next to the door opening. Uncooked ingredients can be placed on the food placement rack/surface inside of the oven 100. The food placement rack/surface can comprise a rack surface with openings or a transparent solid surface. Both configurations allowing for the laser cooking sheets to pass through the food placement surface on which a food item is placed in order to heat the food item from below. When in operation, the door is tightly sealed to prevent laser energy from leaking out.

Once uncooked ingredients are placed inside the oven 100 and the doors are sealed an operator can select cooking preferences through the front touch screen control panel 115. An operator can select whether an item needs to be seared or not and how much heat should be applied to the food item(s) (e.g., for a meat food item the operator can select whether the food item should be cooked medium rare, medium, or well-done).

After the food preparation preference selection process is complete the oven 100 scans for the properties (weight, geometry, temperature, etc.) of the food item and then computes the needed time and power needed to achieve the desired cooking results. During the cooking process, operators are able to receive real-time updates from the oven's display panel 110 showing the remaining cooking time and a current temperature distribution plot of the food items that are being cooked.

The exemplary embodiments of the present invention comprise an oven 100 that employs lasers sheets as a cooking mechanism in order to provide a homogenously heated food item and if desired a uniformly seared surface on the food item. This aspect of the invention is provided by the back and forth movement of at least two food preparation laser devices 120, 125 that project laser sheets upon the food item in order to deliver cooking energy. Said movements evenly deliver heat into the food item that is being cooked. Further exemplary embodiments for oven systems 100 can comprise as many food preparation laser devices 120 as needed within the volume of the thermally insulated cooking chamber of the respective oven 100.

As mentioned above, cold and/or hot areas within the cooking food are eliminated since the intersecting lines of the laser sheets can be completely projected upon the food items; regardless of the flatness and/or unevenness of the food items surfaces. Within the exemplary embodiment of the preset invention the laser sheets can be precisely controlled in terms of the amount of energy that is injected into a food item. As a result, the laser oven 100 of the present invention is capable of achieving a level of precision that can't be achieved with other currently available cooking methods.

Thus, food items with non-uniform cross sections and properties can be uniformly cooked by controlling the exact amount of energy that is projected into the differing sections of a food item. Therefore, very high thermal efficiency levels within the oven system can be achieved since the cooking energy can be precisely and exclusively focused on a food item instead of being randomly dissipated into the environment.

In yet further exemplary embodiments of the present invention the precision laser cooking oven 100 has an autonomous cooking mode. Since the laser sheets deployed within the oven 100 can be precisely controlled cooking results are very predictable once the boundary conditions for a cooking thermal analysis has been determined. Instead of an oven operator cooking by trial and error, the controller 105 within the oven can identify the properties of internally placed food items that are to be cooked. These properties can be utilized to perform a FEA thermal analysis with traveling heat loads in order to determine the time and power consumption that will be needed to achieve any desired cooking results that have been provided by the system operator.

Figure 2:
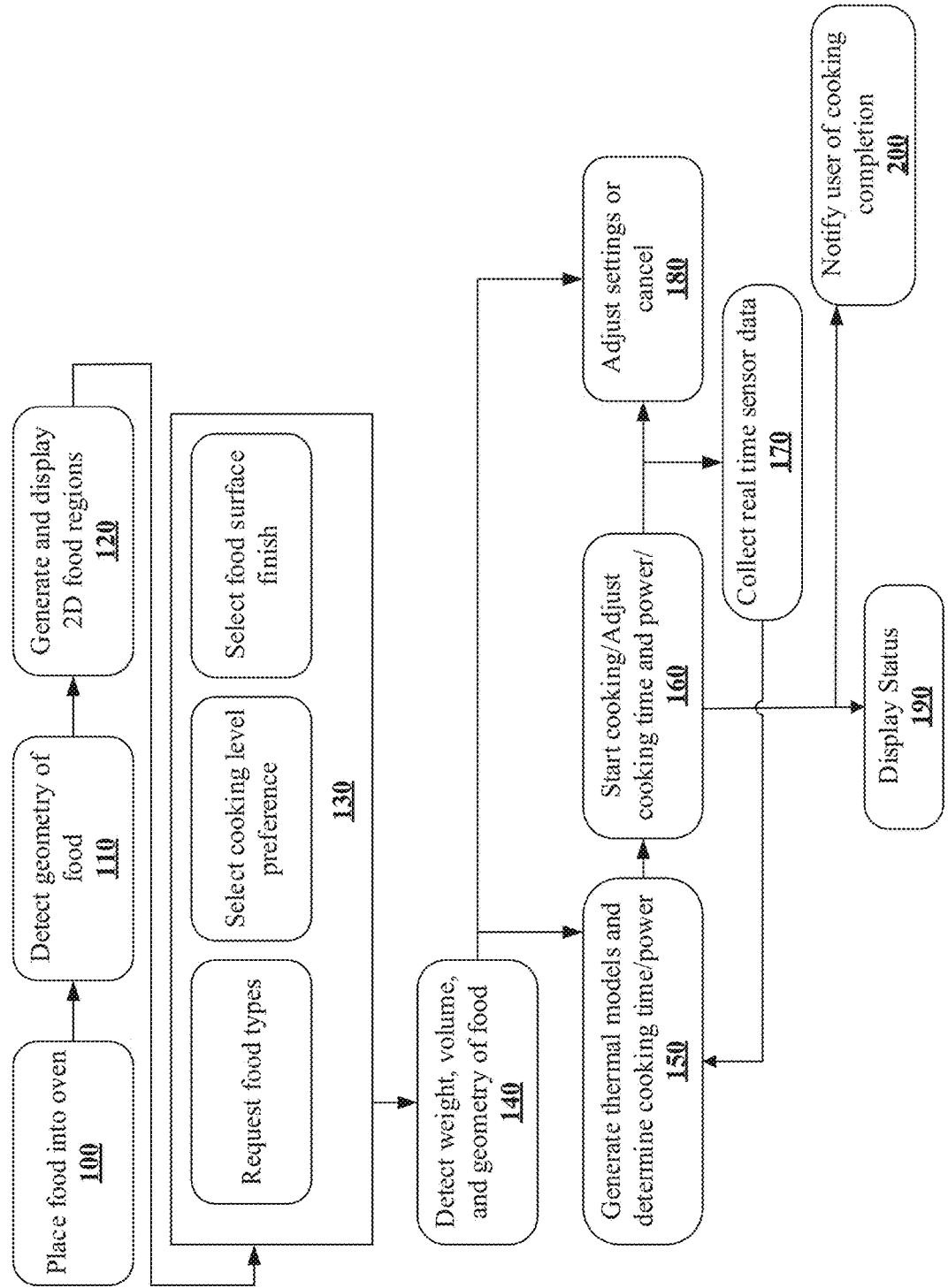
FIG. 2 is a flow diagram of the functional system architecture of an exemplary embodiment of the present invention.

FIG. 2 shows a flow diagram detailing the operation of the precision cooking oven 100 of the present invention. At step 100 the oven operator places a food item or items upon specific regions of the food placement surface. The geometry of the food item is identified at step 110 and thereafter a 2D image of the identified food item is generated and displayed to the oven system 100 operator at the display panel 110. At step 130, the oven 100 operator is queried at the control panel 115 to enter information pertaining to the type of food that is to be prepared, the preferred cooking level for the food, and the surface finish (if any) for the food being prepared.

Next, at step 140, information pertaining to the weight, volume, and geometry of the food items being prepared is gathered from the sensors 130, 135, and 140 and delivered to the controller 105. The controller 105 utilizes the sensor data to generate a cooking thermal model and determine the time and power output needed to cook the food items. At step 160 the oven initiates the cooking process and at steps 170 and 180 collects real-time sensor data regarding the food items and as a result adjusts the cooking settings for the food items. The cooking status for the food items is continuously displayed, as shown at step 190. Upon completion of the cooking process the oven operator is notified of the completion at step 200.

The functional requirements of the precision cooking oven system 100 in accordance with the normal sequence of operation of the oven 100 include the feature of requiring the oven 100 to detect the weight, volume, and geometry of the individual food items that are to be prepared. This step is fundamental for allowing the oven 100 to have the capability to concurrently prepare multiple food items within the oven 100.

As mentioned above and shown in FIGS. 3 and 4, food items 320 are cooked by the usage of multiple laser sheets 310 that are projected from the laser sources 121, 126 of food preparation laser devices 120, 125 that are situated above and below the food items 320. The projected laser sheets 310 are moved by the motors of 122, 127 in a back-and-forth motion upon the food items 320 in order to deliver heat to cook a food item to a desired temperature and result. In the event that hot or cold areas are detected within a food item the width of the projected laser sheets 310 can be adjusted to focus more or less heating power at the detected hot or cold area.

The rail ring 405 is situated in a vertically fixed manner around the food placement surface 330. Further, the rail ring 405 comprises an interior and an exterior surface. Within the exemplary embodiments of the present invention the rail system 405 is simply a rail system that can structurally be reconfigured according to the dimensions of the thermally insulated cooking chamber of a respective oven in which it will be used (e.g., a circular form (as shown), a rectangular form, multiple perpendicular rails, etc.) so that the food preparation laser devices can be properly re-positioned within the oven to cover all food surface areas while cooking.

The at least two food preparation laser devices 120, 125 are in electrical communication with the oven controller 105. The food preparation laser devices 120, 125 are configured to emit the sheets of laser light 310 and to mechanically engage the interior surface of the rail ring 405. Each food preparation laser device 120, 125 comprises a motor mechanism system (122, 127) comprising a primary and a secondary motor mechanism system (not shown). The primary motor mechanisms of the motor mechanism systems 122, 127 are configured to move the emitted laser light sheets in preconfigured directions on the food that has been placed upon the food placement surface. While the secondary motor mechanisms of the motor mechanism systems 122, 127 are configured to move the food preparations laser devices along the interior surface of the rail ring 405 to predetermined locations upon the rail ring 405.

In the exemplary embodiments the width of the projected laser sheets 310 intersecting the food items 320 that are being heated shall range between 0.25 to 20 inches in width. Further, the motion of the projected laser sheets 310 intersecting at the food items 320 that are being heated shall range between 1 m/s to 10 m/s. Thus, the oven system 100 itself is fully capable of using the motion of the laser sheets 310 to control the heat input of food items 320 that are being prepared in addition to being able to adjust the power output of the projected laser sheets upon said food items 320.

The oven 100 is also capable of utilizing differing laser sheets 310 to heat different food items 320 that are concurrently being prepared within the oven 100. This is accomplished by the oven's 100 continuous monitoring of the temperature and physical volumes of all food items 320 that are being prepared within the oven. The detected information is utilized to continuously adjust the cooking time of the food in addition to adjusting the motion and power output of the food preparation laser devices 120, 125.

The controller 105 is responsible for ensuring that the food item 320 types of all regions within the oven 100 where a food item 320 resides upon the food placement surface 330 have been defined (i.e., identified) prior to the initiation of the cooking process. The controller 105 is further responsible for estimating the thermal coefficients and the modulus of elasticity of the food that is to be heated by the oven in accordance with the cooking directions that have been input by the oven 100 operator. The food item information retrieved from the sensors (130, 135, and 140) and the information entered by the oven 100 operator are utilized to perform thermal FEAs in regard to the food items that are being prepared.

The FEA performed by the oven system controller 105 predicts the time required to prepare the food items 320 in accordance with the oven system 100 operators desired cooking results. Also, the FEA can predict and identify hot or cold areas within the volume of the food items that are being heated. As such, the FEA results are interpreted by the controller 105 and thereafter the controller 105 can adjust a food item's 320 heating pattern and power output so as to eliminate any hot or cold areas that have been identified within a food item 320 and as a result ideally achieve a 95% food item surface cooking uniformity.

The display panel 110 is responsible for the graphical displaying of icons representative of food items 320 that are to be cooked. The graphical representations of any food item 320 to be cooked includes a representative icon and food-type identifier for all differing food items 320 that are to be prepared. The graphical representation of a food item 320 also comprises a real-time, color-coded, temperature distribution mapping of each region within the oven 100 where a food item 320 resides (not shown). The temperature distribution maps utilize different colors to represent every 5° F. change in temperature regions within a food item 320, wherein the temperature distribution maps are updated at least every 5 seconds within the cooking system 100.

The control panel 115 comprised within the oven system 100 is a touch-screen panel. The control panel 115 allows for an oven system 100 operator to identify the types of food that are being prepared (e.g., meat, fish, vegetables, etc.) by selecting a graphical representation of a region within the oven 100 where a food item 320 resides upon the food placement surface 330 and then noting the type of food that has been placed in that area of the oven 100. The control panel 115 also requires the oven operator 100 to input information specifying food preparation result preferences (e.g., for a meat dish, if the dish is to be prepared according to rare, medium, or well-done standards, etc.). The control panel 115 will further query an oven operator 100 whether a food item 320 requires searing during the preparation process. During the cooking process the temperature of a food item(s) 320 and the remaining cooking time are continuously displayed by the control panel 115.

Figure 3:
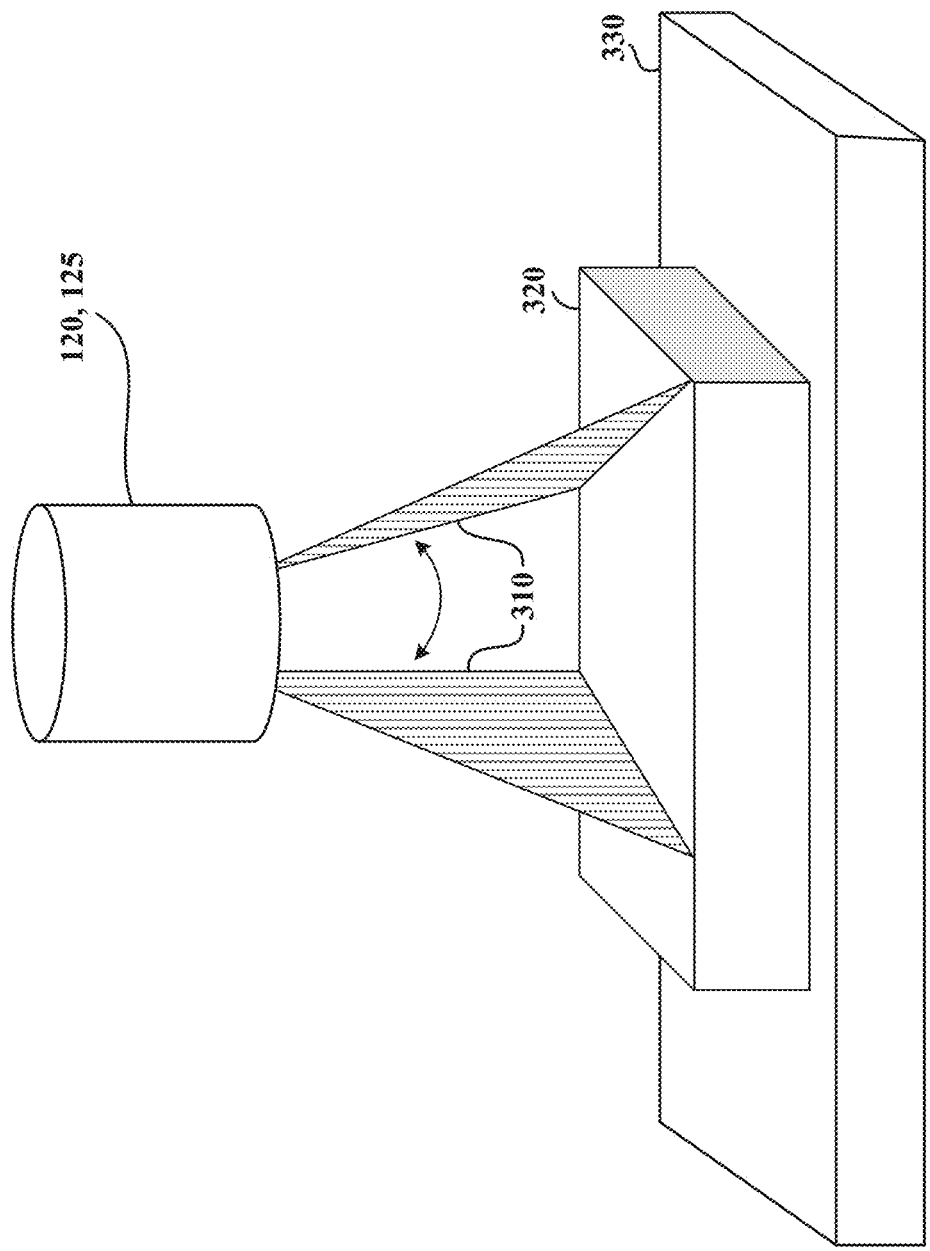
FIG. 3 is a front-facing view of a food preparation laser device and a food product placed upon a food placement surface within an exemplary embodiment of the present invention.

Within the exemplary embodiments of the present invention (as shown in FIGS. 3 and 4) the precision cooking oven 100 comprises: an oven controller 105, in communication with the oven controller 105 a control 115 and display 110 panel, and a thermally insulated cooking chamber (not shown). The thermally insulated cooking chamber further comprises a food placement surface 330, a rail ring 405, at least two food preparation laser devices 120, 125 that are in electrical communication with the oven controller 105, and a plurality of sensor mechanisms 130, 135, 140.

The food placement surface 330 is configured in a fixed horizontal position within the cooking chamber. The rail ring 405 is situated in a vertically fixed manner around the food placement surface 330. Further, the rail ring 405 comprises an interior and an exterior surface.

The at least two food preparation laser devices 120, 125 are in electrical communication with the oven controller 105. The food preparation laser devices 120, 125 are configured to emit sheets of laser light 310, and to mechanically engage the interior surface of the rail ring 405. Each food preparation laser device 120, 125 comprises a primary and a secondary motor mechanism. The primary motor mechanisms are configured to move the emitted laser light sheets 310 in preconfigured directions towards the food placement surface 330. The secondary motor mechanisms are configured to move the food preparations laser devices 120, 125 along the interior surface of the rail ring 405 to predetermined locations upon the rail ring 405.

The plurality of sensor mechanisms 130, 135, 140 are in communication with the oven controller 105. The sensor mechanisms comprise a weight sensor 130, a 3D scanning sensor 135, and a thermal imaging sensor 140.

The weight sensor 130 is configured to detect the weight and density of all food items situated upon the food placement surface 330. While the 3D scanning sensor 135 is configured to detect the volume and geometry of all food items 320 situated upon the food placement surface 330. And the thermal imaging sensor 140 is configured to detect the real-time temperature distribution within the food items 320 situated upon the food placement surface 330.

Within further exemplary embodiments of the present invention the controller 105 determines a thermal coefficient and a modulus of elasticity for each food item 320 that is to be cooked from input information entered at the control panel 115 by an oven operator. The information obtained by the weight 130, 3D scanner 135, thermal imaging sensor 140, and operator input information is utilized by the oven controller 105 to generate a thermal FEA model of all detected food items 320. The FEA model generated by the oven controller 105 has the capability to predict cold regions within the volume of the food items 320 that are to be cooked in accordance with a predetermined default food item cooking setting.

The oven controller 105 utilizes the results of the FEA model to calculate a cooking time, heating pattern, and a cooking power level for the cooking of the food items 320. Further, throughout the food item cooking process the weight 130, 3D scanning 135, and thermal imaging 140 sensors continuously gather sensor information, the detected sensor information being utilized to continuously update the cooking time, heating pattern, and cooking power level for the food items 320. The oven controller 105 utilizes the FEA results to adjust the cooking time, heating pattern, and a cooking power level for the elimination of hot or cold areas within the cooking food items 320 and achieve a thermal food item surface uniformity in the range of 90%-95%.

A yet another exemplary embodiment of the present inventions allows for the precision oven 100 to have the capability to connect (via signal 146) to the Internet or a LAN while the oven 100 is powered on. Further embodiments allow for the oven to be controlled via a remotely controlled application (app) (e.g., an app residing on a smartphone, tablet, etc.). All of the functionality of the local oven's 100 features will be available within the app. The app will have the capability to continuously display the temperature and remaining cooking time for food items 320 in addition to notifying an operator when the cooking process is complete. The app will also have the capability to display the graphical food item 320 representation that is displayed on the oven's 100 display 110 remotely at whatever device that it is running on.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed:

1. A precision cooking oven for the preparation of food products, the precision cooking oven comprising:
   an oven controller;
   a control panel and a display panel, the control and display panels being in communication with the oven controller;
   a thermally insulated cooking chamber, the thermally insulated cooking chamber further comprising:
      a food placement surface, the food placement surface being configured in a fixed horizontal position within the cooking chamber;
      a rail ring, the rail ring situated in a vertically fixed manner around the food placement surface, the rail ring comprising an interior and an exterior surface;
      at least two food preparation laser devices in electrical communication with the oven controller, the food preparation laser devices being configured to emit laser beams that are expanded in one axis resulting in projected sheets of laser light, further, the food preparation laser devices are configured to mechanically engage the interior surface of the rail ring, each food preparation laser device comprises a motor mechanism system, the motor mechanism system further comprising:
         a primary motor mechanism, wherein the primary motor mechanism is configured to move the emitted laser light sheets in preconfigured directions towards food placed on the food placement surface and
         a secondary motor mechanism, the secondary motor mechanism being configured to move the food preparation laser device along the interior surface of the rail ring to predetermined locations upon the rail ring; and
      a plurality of sensor mechanisms in communication with the oven controller, the sensor mechanisms comprising:
         a weight sensor, the weight sensor is configured to detect the weight and density of all food items situated upon the food placement surface;
         a 3D scanning sensor, the 3D sensor is configured to detect the volume and geometry of all food items situated upon the food placement surface; and
         a thermal imaging sensor; the thermal imaging sensor is configured to detect the real-time temperature distribution within the food items situated upon the food placement surface.

2. The precision cooking oven of claim 1, wherein a 2D image of food items that have been placed upon the food placement surface is displayed on the display panel upon the completion of the 3D scanning of the food items.

3. The precision cooking oven of claim 2, wherein the oven controller determines a thermal coefficient and a modulus of elasticity for each food item that is to be cooked from input information entered at the control panel by the oven operator.

4. The precision cooking oven of claim 3, wherein the information obtained by the weight, 3D scanner, thermal imaging sensor, and operator input information is utilized by the oven controller to generate a thermal FEA model of all detected food items.

5. The precision cooking oven of claim 4, wherein the FEA model generated by the oven controller has the capability to predict cold regions within the volume of the food items that are to be cooked in accordance with a predetermined default food item cooking setting.

6. The precision cooking oven of claim 5, wherein the oven controller utilizes the results of the FEA model to calculate a cooking time, heating pattern, and a cooking power level for the cooking of the food items.

7. The precision cooking oven of claim 6, wherein throughout the food item cooking process the weight, 3D scanning, and thermal imaging sensors continuously gather sensor information, the detected sensor information being utilized to continuously update the cooking time, heating pattern, and cooking power level for the food items.

8. The precision cooking oven of claim 7, wherein the oven controller utilizes the FEA results to adjust the cooking time, heating pattern, and a cooking power level for the elimination of hot or cold areas within the cooking food items and achieve a thermal food item surface uniformity in the range of 90%-95%.

9. A method for using a precision cooking oven for the preparation of food products, the method comprising the steps of:
   placing at least one food item upon a food placement surface within a thermally insulated cooking chamber;
   utilizing a plurality of sensor mechanisms for detecting the weight, volume, and geometry of the food item that has been placed upon the food placement surface;
   querying a precision cooking oven operator for input information about the type of food item that has been placed upon the food placement surface;

generating a thermal model of the food item and determining the cooking time for the food item and the power level at which the food item is to be cooked;

cooking a food item by emitting laser beams that are expanded in one axis resulting in sheets of laser light projected in preconfigured directions upon the food item from at least two food preparation laser devices, the food preparation laser devices being configured to mechanically engage the interior surface of a rail ring, the rail ring comprising an interior and an exterior surface being situated in a vertically fixed manner around the food placement surface, each food preparation laser device also comprises a motor mechanism system, the motor mechanism system further comprising:

- a primary motor mechanism, wherein the primary motor mechanism is configured to move the emitted laser light sheets in preconfigured directions upon the food item placed on the food placement surface and
- a secondary motor mechanism, the secondary motor mechanisms being configured to move the food preparation laser device along the interior surface of the rail ring to predetermined locations upon the rail ring; and utilizing the thermal model of the food item to continuously adjust the cooking time and power level output of the cooking laser light sheets upon the food item;

displaying the real-time cooking status of the food item to the precision cooking oven operator; and notifying the precision cooking operator when the food item within the cooking chamber has finished cooking.

10. The method for using a precision cooking oven of claim 9, further comprising the step of displaying a 2D image of the at least one food item that has been placed upon the food placement surface on a display panel.

11. The method for using a precision cooking oven of claim 10, further comprising the step of determining a thermal coefficient and a modulus of elasticity for each food item that is to be cooked from input information provided by the oven operator.

12. The method for using a precision cooking oven of claim 11, further comprising the step of generating a thermal FEA model of the at least one food item from the oven operator input information and the detected food item weight, volume, and geometry information.

13. The method for using a precision cooking oven of claim 12, wherein the generated FEA model has the capability to predict cold regions within the volume of the food items that are to be cooked in accordance with a predetermined default food item cooking setting.

14. The method for using a precision cooking oven of claim 13, further comprising the step of utilizing the FEA model to calculate a cooking time, heating pattern, and a cooking power level for the cooking of the at least one food item.

15. The method for using a precision cooking oven of claim 14, wherein throughout the food item cooking process the weight, volume; and geometry information of the food item is continuously gathered, the gathered information being utilized to continuously update the cooking time, heating pattern, and cooking power level for the food item.

16. The method for using a precision cooking oven of claim 15, wherein the FEA model results are utilized to adjust the cooking time, heating pattern, and cooking power level for the elimination of hot or cold areas within the cooking food item and achieve a thermal food item surface uniformity in the range of 90%-95%.

* * * * *